Feb. 9, 1960   J. L. KALINSKY   2,924,719
RADIOMETRIC METHOD FOR DETERMINING VOLUME
Filed May 31, 1955   2 Sheets-Sheet 1
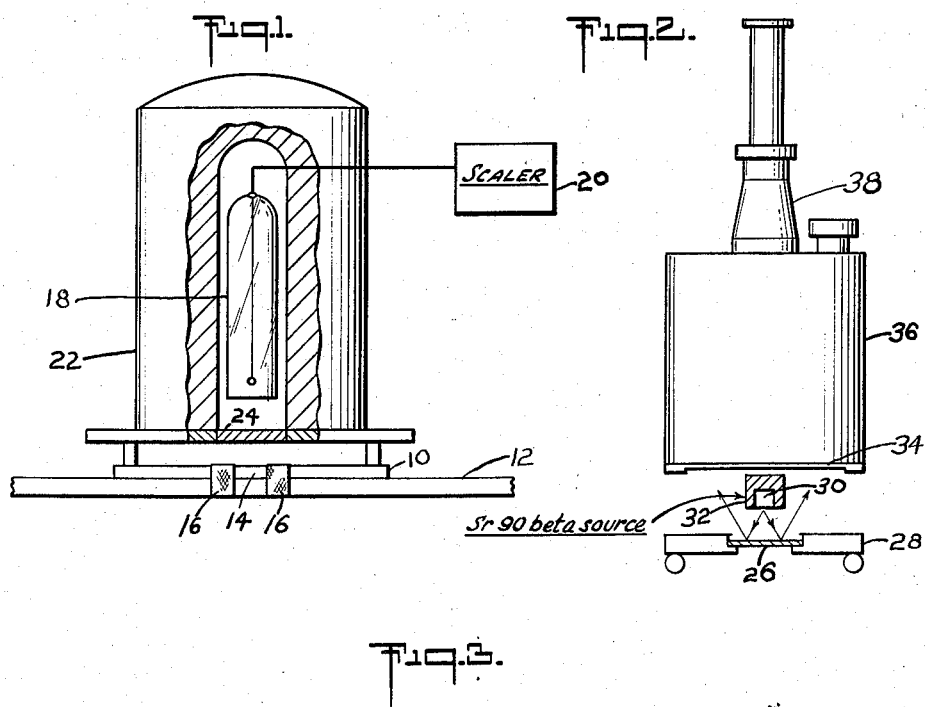
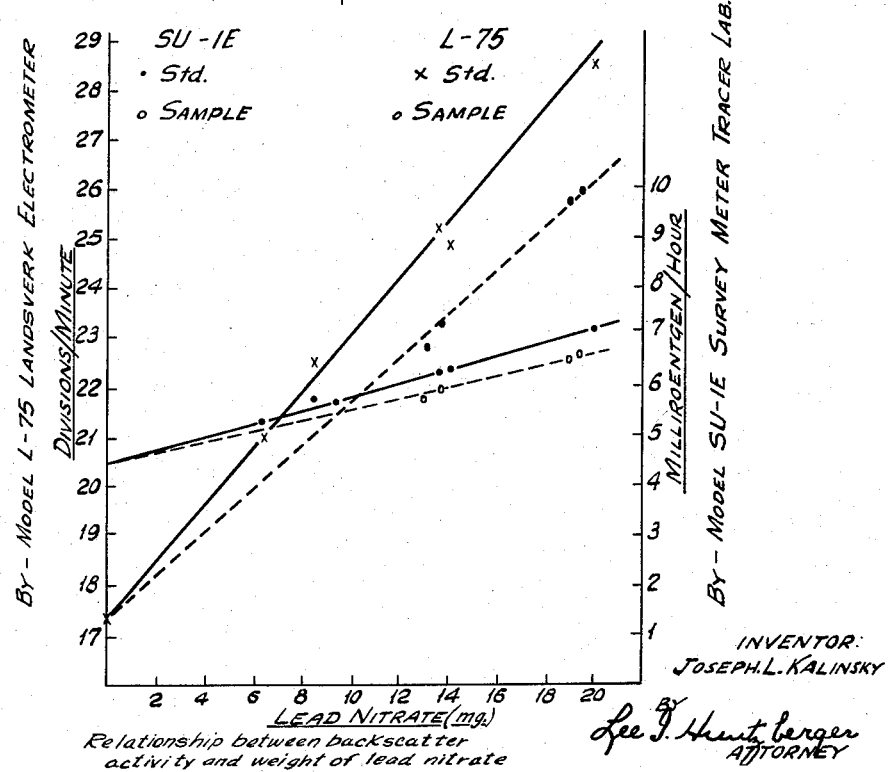
Relationship between backscatter
activity and weight of lead nitrate
INVENTOR:
JOSEPH L. KALINSKY
ATTORNEY Relationship Between Average Depth of Ozonized Nitrile and Radioactivity of Uranium Nitrate Relationship Between The Average Depth Of Crack And Ratio Of Radioactivies Gamma/Beta Of Nitrile Rubber Using Cobalt - 60

INVENTOR:
JOSEPH L. KALINSKY

United States Patent Office 2,924,719
Patented Feb. 9, 1960

2,924,719
RADIOMETRIC METHOD FOR DETERMINING VOLUME

Joseph L. Kalinsky, Valley Stream, N.Y., assignor to the United States of America as represented by the Secretary of the Navy Application May 31, 1955, Serial No. 512,348

28 Claims. (Cl. 250—83.6)

(Granted under Title 35, U.S. Code (1952), sec. 266)

The invention described herein may be manufactured and used by or for the Government of the United States of America for governmental purposes without the payment of any royalties thereon or therefor.

This invention relates to radiometric procedures and more particularly, to the application of such procedures in the evaluation of surface cavities in a face of an object, which has one usefulness in determining the extent of cracking of rubber and other elastomeric compounds. The invention however is not limited merely to such elastomeric materials but is useful in measuring cavities in a face of a solid body. This invention as applied to measurement of cracks in an elastometric body was first disclosed in the article entitled "Application of Radiometric Procedures to the Evaluation of Surface Cracking of Elastomers," by Joseph L. Kalinsky and T. A. Werkenthin, published in Rubber Age, vol. 75, No. 3, June 1954, on pages 375 to 384, and it is intended that all matter in this publication be incorporated by reference into the present specification.

To illustrate the principle of this invention it will be described as used with cracks in rubber and elastomer bodies. When rubber and elastomerlike materials are exposed to oxidation or ozonization, the surface thereof exhibits cracking, the dimension of the cracks being dependent upon the strength and quality of the material involved. To evaluate the characteristics of such material, it is often necessary to assess the extent of the cracking that has taken place because of such oxidation or ozonization. Heretofore, many methods have been utilized for crack measurement. For example, in one method, the individual cracks along the edge of a strip cut from a specimen being tested are examined under a microscope. In a second method, a vacuum cast Wood's metal replica is made of the specimen being tested and shadow lengths of the cracks are examined under a microscope. A third method includes the measurement of the cracks by X-ray absorption techniques. A fourth method measures the relaxation of a tensile specimen caused by the surface cracking as determined by stain gauge measurements. In a fifth method, the volume of crack per unit surface area is determined by the weight of a filling powder included within the cracks. All of these methods, while reasonably accurate and suitable for specific applications of crack measurement problems, are inherently restricted to laboratory investigation and to chosen limits of accuracy. None of these methods could suitably be utilized in the field or away from any laboratory.

Accordingly, it is a primary object of the present invention to provide a method for determining the extent of cracking of deteriorated rubber and elastomeric compounds, such method being of an extremely high accuracy and adaptable for use in field situations.

It is a further object to provide a method as outlined in the preceding object utilizing radiometric measuring means.

In accordance with the present invention there is provided a method of determining a volume comprising the steps of filling the volume with a constant density material, whereby the mass of the material filling the volume has a given value which is proportional to said volume, and indicating the intensity of a radioactive property of said material which has a magnitude which is a function of the value of said mass.

Also, in accordance with the present invention, there is provided a method of determining the crack volume per unit surface area of elastomeric materials. The method comprises the steps of filling the cracks within the area with a substance comprising about 7 parts of an admixture comprising about 95% lead sulfate and about 5% silica gel, and 1 part of a radioactive enriched material of a given radioactivity whereby the mass of the filling material has a given value which is proportional to the crack volume. Any alpha and beta rays emitted by the mass are absorbed and the intensity of the gamma activity of the mass is indicated whereby the intensity of this gamma activity has a magnitude which is a function of the crack volume.

Briefly, this invention contemplates the use of radioactive materials to be utilized in filling specific given volumes, the filling material having a constant density. Measuring a radioactive property of the mass of material within these volumes, a value can be arrived at which is a function of the volumes.

In one aspect of the invention, there is utilized an inert filling material with a radioactive substance incorporated therein. In a second aspect of the invention, there is utilized a soluble inert material of high back-scattering capability which is subjected to a radioactive source such as a beta emitting radioisotope. In a third aspect, there is utilized as a filling material a radioactive substance which emits both alpha beta and gamma rays. In the latter aspect, since the range of the alpha particle can be interpreted as a skin effect, the alpha measurement can be utilized to determine the area of the surface cracks. In a fourth aspect, by utilizing a substance such as cobalt-60, the intensity of gamma radiation emitted therefrom is measured to obtain a value for crack volume and beta radiation intensity is utilized to indicate crack depth.

Other objects and many of the attendant advantages of this invention will be readily appreciated as the same becomes better understood by reference to the following detailed description when considered in connection with the accompanying drawings wherein:

Fig. 1 is an elevation of an apparatus utilized in carrying out one aspect of the method of the present invention.

Fig. 2 is an apparatus utilized in carrying out a second aspect of the method of the present invention.

Fig. 3 is a graph indicating the relationship between back scatter activity and weight of crack filling material.

Figure 4:
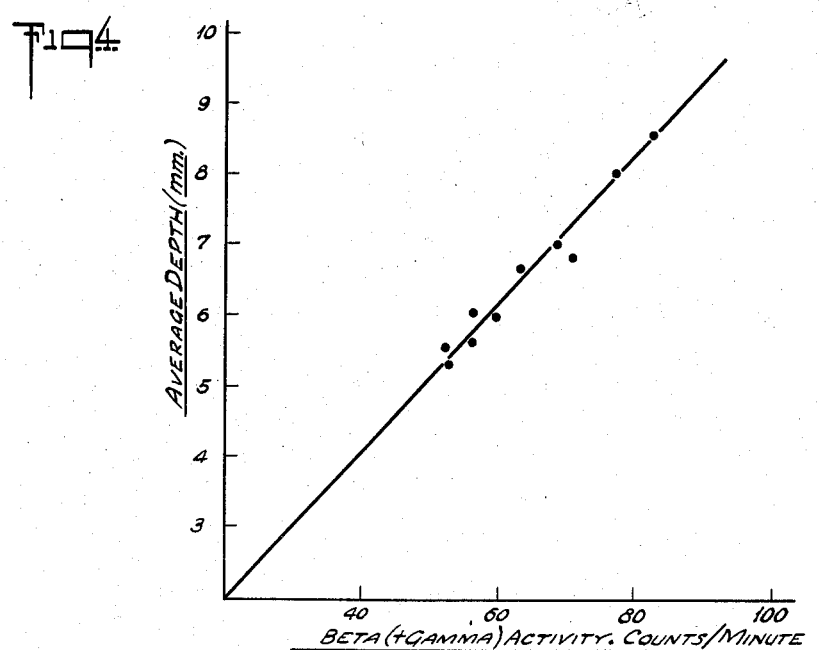
Fig. 4 is a graph which indicates the relationship between the average depth of the cracks in ozonized rubber and radioactivity of an alpha and beta ray filling material.

The heretofore known gravimetric method of Werkenthin disclosed in Rubber Age, vol. 59, pages 697 to 702 (1946), expresses results in terms of cracked volume per unit surface area for a predetermined and specified distension of an elastomer specimen. Lateral variation of the cracked volume is controlled by this fixed elongation, thus permitting the volume measurement to be used as a function of the average depth of cracks with certain limitations. However, for random determinations as encountered in field evaluations, the extent of the elongation may not be known or subject to control. The accuracy of this method is limited by the incomplete recovery of the filling power for weighing purposes. As much as 50% of the powder may be retained within the cracks because of the tackiness of the deteriorated elastomer. To overcome the difficulties presented by the gravimetric method as outline, the present invention has been evolved and utilizes a radioactive property of the filling material and measurement of this property to indicate directly the amount of powder included within the cracks. Examples set forth below describe various radiation measurements made in the practice of the invention and include a single radiation measurement embodiment, a back-scatter measurement embodiment, a uranium nitrate double radiation measurement embodiment and cobalt-60 double radiation measurement embodiment. In the interests of standardization and comparison of results, all tests in the examples were performed with a single elastomer type, viz.; nitrile rubber gasket stock, 1/8" thick cut into tensile strips one inch wide and six inches long. It is of course obvious that other elastomers may be evaluated for crack volume by the present method and nitrile rubber gasket was merely selected by way of example. The size of the specimen was of course not critical. Strips were mounted in a suitable specimen holder, elongated 10% and placed in a chamber to which ozone was admitted. The ozone was produced in concentrations of 50 parts per million in pure oxygen which passed through an angular space around a mercury-vapor, ultraviolet lamp. The time of ozonization was calculated to give various degrees of cracking of the specimen. To simulate field conditions of elastomer exposure, the reverse side and edges of the specimen were protected from ozone attack by a coating of Scotch tape or a plastic spray before exposure. The technique for filling the cracks of the specimen was the same for all methods, that is, the appropriate filling powder was gently worked into the cracks with a dental spatula or other suitable device, care being taken to avoid undue distension of the cracks in the process. The surface area for the powder application was restricted to about one square inch by placing two strips of transparent tape across the specimen at a distance apart of about one inch. The excess powder was removed from the area by means of a soft camel's hair brush. The direct determination of cracked depth, for calibration purposes was made by cutting a narrow, longitudinal section from the ozonized specimen and examining its edge under a measuring microscope.

EXAMPLE I

*Single radiation measurement*

A small amount of material was taken from a radium enriched phosphor and incorporated into a test powder containing about 95% lead sulfate and 5% silica, gel, in the ratio of about 1 part to 7 parts. In order to obtain a linear relationship between the weight of the filling powder and radioactivity, it was necessary to use an aluminum absorber or other suitable device of appropriate thickness such as 880 mg./cm.$^2$ (1/8-inch) to screen out the beta (and alpha) radiations and thus measure the highly penetrating gamma radiations.

Referring now to Fig. 1, there is shown a rubber or other elastomer specimen 10 mounted on a specimen holder 12. The area 14 which is utilized to test crack volume of an ozonized specimen is shown delineated by masking tape 16. Responsive to the radioactive radiation emanating from the crack filling material within area 14 of specimen 10, is a radiation detection device such as an open window Geiger-Müller counter tube 18 whose output is applied to a conventional scaler 20. Surrounding tube 18 is a suitable lead shield 22 substantially as shown. Intermediate area 14 and tube 18 is a disk of aluminum 24 which serves to screen out substantially all of the alpha and beta radiations emanating from the filling material within the cracks in area 14 so that with this arrangement, tube 18 is only subjected to gamma radiation.

In order to compare the result of the single radiation measurement embodiment of the present invention to the known gravimetric method, the filling material was removed from the cracks, collected into a weighing dish, weighed and the sample was then recounted for residual radiation. In the following table there are indicated the results of the single measurement method as compared to the known gravimetric method.

TABLE I

| Sample Number | 1 | 2 | 3 | 4 | 5 | 6 | 7 |
| --- | --- | --- | --- | --- | --- | --- | --- |
| Method of Powder Application | S | S | S | S | S | B | S |
| Weight of Powder Occluded (mg., uncorrected) | 34.2 | 30.5 | 26.7 | 13.0 | 21.2 | 11.0 | 27.5 |
| Weight of Powder Occluded (mg., corrected) | 32.9 | 29.6 | 25.1 | 12.5 | 20.0 | 10.8 | 26.4 |
| Weight of Powder Tapped Out (mg.) | 14.0 | 12.0 | 10.1 | 6.2 | 9.4 | 4.4 | 17.0 |
| Percent Recovery | 43 | 41 | 40 | 50 | 47 | 41 | 64 |
| Crack Volume (mm.$^3$/dm.$^2$)—By known method (A) | 153 | 132 | 111 | 68 | 103 | 73 | 183 |
| Crack Volume (mm.$^3$/dm.$^2$)—By Method of Invention (B) | 359 | 324 | 273 | 137 | 218 | 178 | 284 |
| Ratio of (A)/(B) | 2.35 | 2.45 | 2.46 | 2.01 | 2.12 | 2.44 | 1.55 |

In this table "S" means the powder was applied by spatula, and "B" means the powder was applied by a brush.

EXAMPLE II

*Back-scatter measurement*

An inert powder of high atomic number such as lead nitrate or other suitable compound is utilized to fill the cracks of an ozonized or oxidized elastomeric specimen and a source of strong beta radiation such as a salt of strontium-90 is externally mounted and interposed between the specimen containing the crack filling material and a radiation detector. The radiation detector may be any suitable device for this purpose such as an electrometer, a survey meter, etc. Referring now to Fig. 2, there is shown the apparatus in carrying out the method of Example II. After the cracks in the specimen for a predetermined area are filled with the inert lead nitrate powder, lead nitrate being selected as the filling material because of its high solubility in water and high efficiency as a back-scatter material, a small amount of water such as about 0.2 milliliter is applied to the area of powder application and a suitable period such as about 5 minutes was allowed for the solution of the lead nitrate. The lead nitrate solution was then blotted by a piece of filter paper in the form of a disc 26 of about 1 1/4 inch diameter. Disc 26 was then dried with a suitable heating device such as an infrared lamp and then placed in a plastic holder 28 under the source and detector as shown in Fig. 2. A suitable manner of providing a holder for disc 26 was to drill a one inch diameter hole in the center of a piece of plastic about 1/8 inch thick and 3 inches in diameter. The hole was countersunk to half depth to firmly contain disc 26. Standardization of this method was accomplished by applying the same volume of standard solutions of lead nitrate directly to the elastomer, followed by the same recovery and measurement method. As shown in Fig. 2, a strontium-90 beta radiation source 30 is disposed opposite and spaced from disc 26 so that any radiation therefrom impinges on disc 26 in a line substantially perpendicular to the plane thereof. Beta radiation source 30 is suitably provided by placing a small drop of strontium-90 chloride solution in the hole of a brass cup 32 and gently warming the cup to the point where the solution dries. After drying, the hole is covered with aluminum foil of about 0.005-inch thickness, the foil being secured with celluloid cement. The beta rays or electrons from the strontium-90 source bombard disc 26 and the electrons are back scattered by the lead nitrate in different directions under the influence of electrons and coulombic fields of the nuclei of the lead nitrate. The back-scattered electrons pass through mica window 34 into ionization chamber 36 and are suitably detected by an electrometer generally designated as 38. As is well known, the radiation particles produce ions in the confined gas of the ionization chamber which drift to the corresponding electrode and reduce the applied charge. The radioactive decay rate is proportioned to the number of ions formed from the incoming particle, and thus a function of the specific ionization of a particular radioactivity.

In the graph Fig. 3, there is shown the relationship between back-scatter activity and weight of lead nitrate in the foregoing method. The abscissa is milligrams of lead nitrate, the left ordinate is divisions per minute using an electrometer as the radiation detector and the right ordinate is in milliroentgens per hour utilizing a survey meter as the radiation detector. The solid line having small $x$ marks practically represents the results using the standard lead nitrate solution in disc 26 and an electrometer as the radiation detection device. The solid line having small solid dots represents the results with a standard lead nitrate solution utilizing a survey meter as the detection device. Dashed lines having solid dots and open circles show the results of the method set forth with unknown lead nitrate samples utilizing an electrometer and a survey meter respectively as radiation detection devices. From the graph, it may be seen that the efficiency of extraction of the lead nitrate for measeurement is about 85% thus permitting the use of an empirical factor for calibration purposes. From the information contained in Fig. 3, it was determined that 20 milligrams of lead nitrate correspond to an approximate average depth of the cracks of about 1.3 millimeters.

EXAMPLE III

*Determination of crack volume and surface area by double radiation measurement*

In this embodiment, in the apparatus utilized for the alpha particle count, the radiation detection device utilized was an open window ionization chamber and electrometer as depicted in Fig. 2. As in the previous examples, the cracks in the specimen in a chosen surface area were filled with a material such as uranium nitrate in powder form. The open end of the electrometer was placed over the powder filled cracks leaving a minimum clearance between the specimen and the radiation detector. A first count was made which essentially indicated the quantity of alpha particles with very little contribution from the beta particles and a negligible amount of gamma radiation. A second count was next made by placing a mica window at the base of the electrometer or by utilizing as the radiation detector, the Geiger-Müller tube and scaler of Fig. 1. Since the windows of the detectors substantially absorb all of the alpha and very weak beta radiations, there are effectively counted the strong beta particles with but a small contribution from the gamma radiation. It is believed that the effect of the gamma radiation on the beta ray count is lower when the electrometer is used. Since high energy beta radiation (2.3 mev. max.) suffers only minor self-absorption up to several millimeters depth of crack, it can be expressed readily in terms of volume of crack. In the following table, there are set forth results for the method utilizing uranium nitrate as a filling material. The term c.p.m. indicates counts per minute and the term d.p.m. indicates divisions per minute.

TABLE 2

| Sample No. | Wt. Powder Contained (mg.) | Beta/Alpha Ratio (c.p.m./d.p.m.) | Average Crack-Depth (mm.) |
|---|---|---|---|
| 1 | 5.5 | 52.5 | 0.54 |
| 2 | 9.5 | 56.2 | 0.60 |
| 3 | 11.0 | 76.0 | 0.80 |
| 4 | 10.8 | 70.0 | 0.68 |
| 5 | 3.7 | 36.7 | 0.45 |
| 6 | 10.0 | 73.7 | 0.64 |
| 7 | 4.6 | 52.0 | 0.55 |
| 8 | 6.7 | 81.6 | 0.86 |
| 9 | 5.8 | 55.8 | 0.55 |
| 10 | 7.5 | 63.0 | 0.66 |
| 11 | 5.2 | 59.5 | 0.59 |
| 12 | 7.0 | 55.0 | 0.57 |

Fig. 4 depicts the relationship between the average depth of ozonized nitrile rubber and radioactivity of uranium nitrate. The abscissa is beta (plus gamma) activity. Counts/minute divided by alpha activity. Divisions per minute.

Since alpha and low energy beta rays are characterized by their low penetrating power, the intensity of these types of radiation is related to the quantity of uranium nitrate or other suitable powder deposited in the upper layers of the cracks and are therefore a function of the surface area of the cracks. Accordingly, it is readily seen that with the embodiment set forth in the present example, it is possible both to obtain a value for the volume of the cracks and the surface area thereof.

EXAMPLE IV

*Determination of crack volume and crack depth by double radiation measurement*

In this example, the filling material for the ozonized or oxidized elastomer specimen that was used was a salt of cobalt-60, the oxalate being preferred. Radioactive cobaltous oxalate may be prepared by adding about 0.01 milliliter of cobalt-60 chloride solution to 100 milliliters of solution containing about 3.9 grams of non-radioactive hydrated cobaltous chloride. This solution is warmed and 50 milliliters of a 6 percent ammonium oxalate solution is added slowly with vigorous stirring. After cooling the reaction solution to room temperature, the precipitate of finely divided cobalt-60 oxalate is filtered, washed and dried in a vacuum oven for about two hours at 100° C. In such quantities, the yield is about 2.3 grams of cobaltous oxalate with a gamma and beta activity of 145 and 4400 c./m./mg., respectively, using a thin mica end window Geiger-Müller tube and a scaler. To obtain the gamma radiation count of the cobaltous-60 oxalate filling powder in the elastomer specimen, the end window Geiger-Müller tube and scaler were mounted in a vertical position by suitable support and a strip of lead having a hole through its center was positioned over the specimen so that, the hole being in register with the specimen area to be measured for crack volume. To insure that no beta radiation affected the gamma radiation count, an aluminum absorber of suitable thickness such as about 134 milligrams cm.$^2$ was placed to cover the hole in the lead strip. To count combined beta and gamma radiations, the absorber was removed.

In the following table, there is set forth the results using cobaltous-60 oxalate as a filling powder. The terms c.p.m. indicates counts per minute.

TABLE 3

| Sample No. | Time of Exposure to Ozone (50 p.p.m.) (min.) | Gamma/Beta Ratio (c.p.m./c.p.m.) | Average Crack-Depth (mm.) |
| --- | --- | --- | --- |
| 1 | 5 | 0.070 | 0.25 |
| 2 | 12 | 0.097 | 0.78 |
| 3 | 8 | 0.069 | 0.52 |
| 4 | 4 | 0.062 | 0.28 |
| 5 | 12 | 0.089 | 0.71 |
| 6 | 6 | 0.060 | 0.38 |
| 7 | 3 | 0.067 | 0.14 |
| 8 | 20 | 0.158 | 1.20 |
| 9 | 15 | 0.104 | 0.90 |
| 10 | 10 | 0.083 | 0.64 |
| 11 | 6 | 0.083 | 0.47 |
| 12 | 15 | 0.091 | 0.84 |
| 13 | 11 | 0.080 | 0.67 |
| 14 | 8 | 0.072 | 0.47 |
| 15 | 15 | 0.133 | 1.09 |
| 16 | 20 | 0.160 | 1.25 |
| 17 | 10 | 0.082 | 0.75 |

Figure 5:
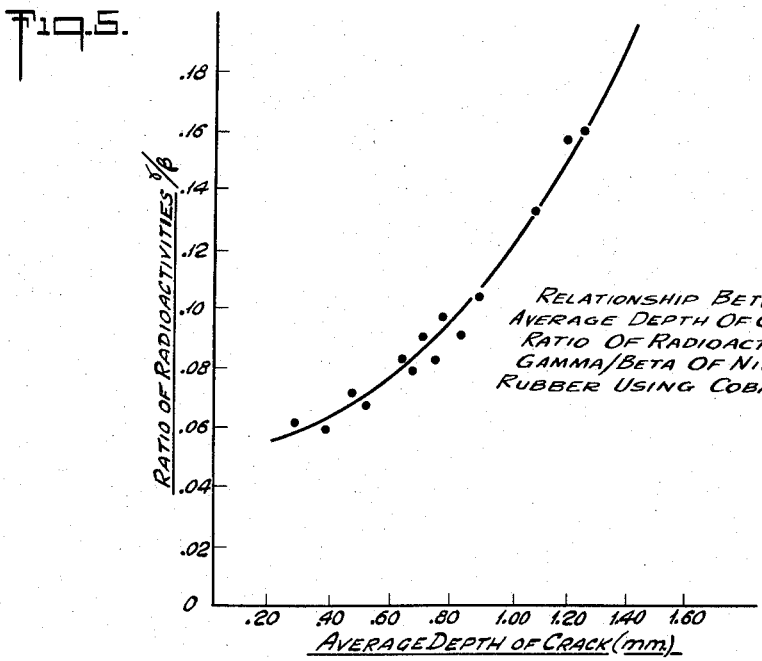
Fig. 5 is a graph which indicates the relationship between the average crack depth of ozonized rubber and the ratio of gamma to beta radioactivities of a radioactive cobalt filling material.

In Fig. 5 there is depicted the relationship between the average depth of cracks in the surface area being measured and the ratio of radioactivities gamma/beta of nitrile rubber using cobalt-60. The strong gamma radiation of the cobalt-60 filling powder by virtue of its high penetrating power, can be interpreted in terms of volume of crack per unit surface of area exposed, within the limits of cracking normally encountered. The range of the weak beta radiation, equal to a depth of about 0.8 millimeter in the powder has a particular significance in determining depth and surface of crack because of the exponential self-absorption of the radiation within the powder.

In summary, this invention teaches the use of a radioactive property of a filling material to determine the volume surface area of the volume and depth thereof. For laboratory investigations, as used for comparison purposes, where the elongation of the specimen can be predetermined, single measurement procedures utilizing gamma or beta back-scattered radiation can be effectively applied. For field use, or for random specimens, where the elongation factor is either unknown or not subject to control, the extent of a crack dimension, viz; crack depth, more or less independent of the elongation, is desirable. Such information is readily obtained by the double radiation measurement, viz; discrimination between the different types of emission of uranium or like substance and cobalt-60 or like substance.

Obviously many modifications and variations of the present invention are possible in the light of the above teachings. It is therefore to be understood that within the scope of the appended claims the invention may be practiced otherwise than as specifically described.

I claim:

1. A method of determining a measurement of a space comprising the steps of filling the space with a constant density, radioactive material having incorporated therein a predetermined amount of a radioactive substance in the form of a dry, finely divided powder, whereby the mass of the material filling the space has a given radioactivity which is proportional to said space, and determining the intensity of the radioactivity of said mass in said space by means of ionization of a gas by rays from said mass, the magnitude of said intensity being a function of said mass.

2. A method as defined in claim 1 wherein there is utilized as said filling material, a powder comprising lead sulfate, a silica gel and a small amount of radium enriched phosphor.

3. A method as defined in claim 1 wherein there is utilized as said filling material a powder comprising 7 parts of an admixture comprising 95% lead sulfate and 5% silica gel, and 1 part of a radium enriched phosphor.

4. A method of determining a measurement of a space comprising the steps of filling the space with a constant density material which is capable of reflecting radiant energy, whereby the material filling the space has a given radioactivity value which is proportional to said space, removing said material from said space, subjecting said removed material to irradiation from a radioactive source, indicating the energy reflected by said irradiated material, whereby the magnitude of the intensity of said reflected energy is a function of said material.

5. A method as defined in claim 4 wherein there is utilized as a filling material an inert powder of high atomic number which is highly soluble in water and possesses high efficiency as a back-scatter material of radioactive radiation.

6. A method as defined in claim 5 wherein strontium-90 is utilized as said radioactive source.

7. A method of determining the volume of cavities in a solid body comprising the steps of first filling the cavities with a constant density radioactive material, in dry, finely divided powder form, which emits both strong gamma rays and relatively weak beta rays, whereby the mass of the material filling the volume has a given value which is proportional to said volume, and determining the gamma emitting and beta emitting acitvity of said filling material by ionization of a gas by such rays, the magnitude of the intensity of said gamma activity being a function of said volume and the intensity of said beta activity being a function of the length of the dimension of said volume which is parallel to the path of said beta rays.

8. A method of determining the total volume of cavities in a predetermined surface area of a solid body comprising the steps of filling the cavities within said area with dry, finely divided, powdered lead nitrate whereby the mass of said lead nitrate in said cavities is proportional to said volume of cavities, dissolving the mass of the lead nitrate in said cavities in water and absorbing the solution in a liquid absorbing member, drying the member containing the lead nitrate dissolved from said cavities, subjecting said member with its absorbed lead nitrate to the beta radiation of a strontium-90 chloride solution, and indicating the intensity of the back-scattering of said beta radiation by the said lead nitrate in said member whereby the magnitude of the intensity of said back-scattering is a function of said volume.

9. A method for determining the total volume of cavities per unit surface area of a face of a solid body and the total surface areas of said cavities comprising the steps of filling the cavities within said surface area with uranium nitrate which has a given radioactivity which is proportional to said volume, indicating the intensity of the alpha activity of the mass of said uranium nitrate in said cavities, and indicating the intensity of the beta activity of said mass of uranium nitrate in said cavities, the magnitude of the intensity of said alpha activity being a function of the total surface areas of said cavities and the intensity of said beta activity being a function of said total volume of the cavities.

10. A method of determining the crack volume and crack depth for a predetermined surface area of an elastomeric material comprising the steps of filling the cracks within said area with powdered cobaltous-60 oxalate, measuring the intensity of the beta radiation of said cobaltous-60 oxalate in said cracks by ionization of a gas by such rays, then absorbing said beta radiation from said oxalate and concomitantly measuring the intensity of the gamma radiation of said cobaltous-60 in said cracks, the magnitude of the intensity of said beta radiation being a function of the depth of said cracks, and the magnitude of said gamma radiation being a function of the volume of said cracks.

11. The method for use in determining the volume and depth of cavities in the surface of a body, which comprises filling the cavities in that surface with a finely divided, dry powder containing a radioactive material, and then determining the intensity of the weak beta rays emitted by said material by their ionization of a gas to indicate the total surface area of the cavities, and determining the intensity of the strong gamma rays emitted by said material by their ionization of a gas to indicate the volume of said cavities, and whereby the ratio of the two measurements gives an indication of the average depth of the cavities.

12. The method as set forth in claim 11 wherein the radioactive filling material contains cobaltous-60 oxalate.

13. The method for use in determining the total surface area of cavities in a face of an object, which comprises filling said cavities in a measured face area of said object with a finely divided, dry powder containing a radioactive material, and then determining the strength of the weak beta rays emitted by said material in said cavities in said measured area by their ionizaton of a gas to indicate the total surface area of the cavities in said measured face area.

14. The method for determining the total volume of the cavities in a face of an object which comprises filling said cavities in a selected area of said face of said object with a finely divided dry powder containing a radioactive material, and then determining the intensity of the strong gamma ray emission from the powder in said cavities in said selected area of said face of said object by the ionization of a gas by said rays, to indicate the total volume of said cavities.

15. The method as set forth in claim 13, wherein said radioactive material is a cobalt oxalate.

16. The method as set forth in claim 14 wherein said radioactive material is a cobalt oxalate.

17. The method as set forth in claim 11 wherein said powder is composed of about 7 parts of an admixture containing about 95% lead sulfate and about 5% silica gel with about 1 part of a radioactive material of a known radioactivity.

18. The method as set forth in claim 14 wherein said powder is composed of about 7 parts of an admixture containing about 95% lead sulfate and about 5% silica gel with about 1 part of a radioactive material of a known radioactivity.

19. The method as set forth in claim 14, and absorbing the alpha and beta rays leaving the powder in the cavities of said object before such determination, whereby the determination will be made by the intensity of the gamma rays.

20. A method for use in determining the depth of cavities in a face of an object which comprises filling said cavities in a selected area of a face of said object with a finely divided, dry powder containing a radioactive material and capable of emitting beta rays in known amounts, and determining the strength of the beta rays emitted by said material in said selected area by their ionization of a gas.

21. The method for use in determining the total volume of the cavities in a face of an object which comprises filling said cavities in a selected area of said face of said object, with a finely divided, dry powder containing a radioactive material of known ray emitting value, screening out from the rays emitted from said selected area only the alpha and beta rays, and determining the intensity of the remaining gamma rays emitted from said selected area by their ionization of a gas, which intensity is a function of the total volume of said cavities.

22. The method as set forth in claim 21 wherein said screening is by a sheet of aluminum disposed across the path of the emitted rays and determining the intensity of the emitted rays passing through said aluminum sheet.

23. A method for use in determining the total volume and surface area of cavities in a face of an object, which comprises filling said cavities in a selected area of said face with a dry finely divided powder containing a radioactive material emitting alpha, beta and gamma rays, determining, from a position in close proximity to said surface, the intensity of the alpha rays emitted from said material in said cavities by means of their ionization of a gas, additionally absorbing from the emitted rays approximately all of the alpha and the very weak beta radiations, and determining the intensity of the strong beta rays by an electrometer which lowers the effect of the gamma rays on the beta ray count, which last intensity is a function of and can be expressed as an indication of the volume of said cavities, and the intensity of the first determination is a function of and indicates the total surface areas of said cavities.

24. The method as set forth in claim 23 wherein said powder contains uranium nitrate.

25. In the method for use in determining the total volume and depth of cavities in a selected area of a face of an object, in which said cavities in said area are filled with a dry, finely divided powder containing a radioactive material, and the intensity of radiation is determined as an indication of said volume and depth, the steps of obtaining data for use in such determination which comprise determining the intensity of both the gamma and beta rays emitted from the material in said face of said object by means of their ionization of a gas, and also separately determining with a radiation detector employing ionization of a gas radiation by rays the intensity of such of said gamma rays as will pass through an aluminum absorber disposed across a hole in a sheet of lead which hole is disposed over and in register with said area.

26. The method as set forth in claim 25 wherein the radioactive material is a radioactive salt of cobalt-60.

27. The method as set forth in claim 25 wherein the radioactive material is a radioactive oxalate salt of cobalt-60.

28. The method for use in determining certain dimensions of cavities in a face of an object, which comprises filling said cavities in a selected area of said face of said object, with a dry, finely divided powder containing a radioactive material distributed uniformly therethrough, and having a radioactivity which is proportional to its volume contained in such cavities, and determining the intensities of each group of the alpha, beta and gamma rays emitted from the powder contained in the cavities of said selected face area by means of ionization of a gas by such rays, which intensities of the different rays are the functions of and are proportional to certain measurements of such cavities.

References Cited in the file of this patent

UNITED STATES PATENTS

| | | |
|---|---|---|
| 2,267,999 | Switzer | Dec. 30, 1941 |
| 2,477,776 | Talbot et al. | Aug. 2, 1949 |
| 2,579,243 | Reid | Dec. 18, 1951 |
| 2,588,210 | Crisman et al. | Mar. 4, 1952 |
| 2,629,831 | Atchley | Feb. 24, 1953 |
| 2,733,353 | Pirson | Jan. 31, 1956 |
| 2,831,121 | Zito | Apr. 15, 1958 |

OTHER REFERENCES

"Radioactive Isotopes as Tracers," by A. W. Kramer, from Power Plant Engineering, November 1947, pages 105 to 108.

Linder: Abstract of application Serial No. 90,331, published February 27, 1951, 643 O.G. 1333.

Arthur: Abstract of application Serial No. 206,829, published February 26, 1952, 605 O.G. 1177.

"Beta-Ray-Excited Low-Energy X-Ray Sources," by L. Reiffel, from Nucleonics, March 1955, vol. 13, No. 3, pages 22, 23 and 24.